United States Patent
Chatlani et al.

(10) Patent No.: US 9,721,584 B2
(45) Date of Patent: Aug. 1, 2017

(54) WIND NOISE REDUCTION FOR AUDIO RECEPTION

(71) Applicants: Navin Chatlani, Allentown, PA (US); Fabrice M. Plante, Rockville, MD (US); Gurhan Saplakoglu, Lebanon, NJ (US)

(72) Inventors: Navin Chatlani, Allentown, PA (US); Fabrice M. Plante, Rockville, MD (US); Gurhan Saplakoglu, Lebanon, NJ (US)

(73) Assignee: Intel IP Corporation, Santa Clara, CA (US)

( * ) Notice: Subject to any disclaimer, the term of this patent is extended or adjusted under 35 U.S.C. 154(b) by 169 days.

(21) Appl. No.: 14/330,810

(22) Filed: Jul. 14, 2014

(65) Prior Publication Data

US 2016/0012828 A1    Jan. 14, 2016

(51) Int. Cl.
*G10L 21/0232* (2013.01)
*G10L 21/028* (2013.01)

(52) U.S. Cl.
CPC ........ *G10L 21/0232* (2013.01); *G10L 21/028* (2013.01)

(58) Field of Classification Search
CPC .... H04R 1/1083; G10L 21/0208; G10L 21/02
USPC ........ 381/71.11, 111, 92, 94.1; 704/226, 268
See application file for complete search history.

(56) References Cited

U.S. PATENT DOCUMENTS

| | | | |
|---|---|---|---|
| 6,175,602 B1 | 1/2001 | Gustafsson et al. | |
| 8,078,474 B2 * | 12/2011 | Vos | G10L 19/0208 704/500 |
| 8,750,526 B1 * | 6/2014 | Santos | H04R 3/00 341/61 |
| 9,076,437 B2 * | 7/2015 | Niemisto | G10L 19/0204 |
| 2004/0165736 A1 | 8/2004 | Hetherington et al. | |
| 2005/0238183 A1 | 10/2005 | Ozawa | |
| 2006/0120540 A1 * | 6/2006 | Luo | H04R 25/407 381/98 |
| 2007/0076896 A1 * | 4/2007 | Hosaka | G10K 11/1788 381/71.11 |
| 2008/0317261 A1 * | 12/2008 | Yoshida | H04R 3/04 381/94.1 |
| 2009/0002498 A1 | 1/2009 | Oku | |
| 2010/0329471 A1 * | 12/2010 | Dunn | H04R 3/007 381/57 |
| 2011/0058687 A1 * | 3/2011 | Niemisto | G10L 19/0204 381/99 |

(Continued)

OTHER PUBLICATIONS

PCT/US2015/031549, "Notification of Transmittal of the International Search Report and the Written Opinion of the International Searching Authority, or the Declaration" mailed Oct. 15, 2015, pp. 15.

*Primary Examiner* — Douglas Godbold
*Assistant Examiner* — Mark Villena
(74) *Attorney, Agent, or Firm* — Blakely, Sokoloff, Taylor & Zafman LLP (57) ABSTRACT

Wind noise reduction is described for audio signals received in a device. In one embodiment, an audio signal is decomposed into a plurality of sub-bands, the audio signal including wind noise, a first sub-band of the plurality of sub-bands low-pass filtered, wind noise is removed from the first sub band and the first sub-band is combined with the other sub-bands after removing wind noise.

18 Claims, 7 Drawing Sheets

(56) References Cited

U.S. PATENT DOCUMENTS

| | | | |
|---|---|---|---|
| 2012/0148067 A1* | 6/2012 | Petersen | H04R 3/005 381/92 |
| 2012/0191447 A1* | 7/2012 | Joshi | G10L 21/0208 704/226 |
| 2012/0195433 A1* | 8/2012 | Eppolito | H04S 3/008 381/1 |
| 2012/0209611 A1* | 8/2012 | Furuta | G10L 21/038 704/268 |
| 2012/0310639 A1* | 12/2012 | Konchitsky | G10L 21/0208 704/226 |
| 2013/0129117 A1* | 5/2013 | Thomsen | H04R 3/00 381/111 |
| 2013/0142349 A1* | 6/2013 | Liu | G10K 11/002 381/71.11 |
| 2013/0243318 A1* | 9/2013 | Honda | H04N 9/045 382/167 |
| 2014/0161271 A1* | 6/2014 | Teranishi | H04R 5/04 381/71.7 |
| 2015/0222248 A1* | 8/2015 | Yamada | H03H 17/0642 341/61 |

\* cited by examiner

WIND NOISE REDUCTION FOR AUDIO RECEPTION

FIELD

The present application relates to the field of audio processing and in particular to removing wind noise from received audio signals.

BACKGROUND

Many different devices offer microphones for a variety of different purposes. The microphones may be used to receive speech from a user to be sent to users other devices. The microphones may be used to record voice memoranda for local or remote storage and later retrieval. The microphones may be used for voice commands to the device or to a remote system or the microphones may be used to record ambient audio. Many devices also offer audio recording and, together with a camera, offer video recording. These devices range from portable game consoles to smartphones to audio recorders to video cameras etc.

When wind or other air movement impacts a microphone, a noise is created which may impair, overwhelm, or render unintelligible the rest of the audio signal. A sound recording may be rendered unpleasant and speech may not be recognizable for another person or an automated speech recognition system. While materials and structures have been developed to block wind noise, these typically require bulky or large external microphones which may be impractical, inconvenient, or impossible to use with many devices. There are also software-based wind noise reduction systems that use complex algorithms to isolate the wind noise from other sounds and then reduce or cancel the wind noise.

Wind noise reduction techniques tend to be complex because wind noise is very non-stationary and, if there are multiple microphones, the noise will be different at each microphone. Wind noise represents a special class of noise because it is directly generated by the turbulence of a wind stream around the device. The turbulence will be different at different positions on the device and change quickly over time.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Wind noise reduction systems that rely on signal analysis often require as high spectral resolution to distinguish wind from other sounds. The system must also update at a high rate because of the transient nature of the wind noise. The processing demands increase with higher sampling frequencies. While speech may be sampled at 8 kHz, higher quality audio may be sampled at 32 kHz, 48 kHz, or higher rates. Wind noise analysis for these signals requires high computational (MIPS) and memory (KB) resources to process.

The computational and memory requirements may be reduced by dividing the input audio into sub-bands. This allows the wind noise reduction system to work with a sub-band with a lower sampling frequency. As a result the overall input audio sampling frequency may be much greater than 8 kHz. The computation and memory requirements are largely independent of the sampling rate of the input audio. Multiple simultaneous microphone recordings may also be processed. Many video recorders record two or more independent audio channels to support stereo or surround sound modes. Even some smartphones offer four microphones to provide depth and spatial filtering to recorded audio.

The audio frequency spectrum of wind noise typically includes very low pitched sounds but usually does not exceed audio frequencies above 4 kHz. This physical characteristic of wind noise may be used to divide the input audio into two or more separate sub-bands, the sub-band that includes the wind noise can be limited to approximately 4 kHz. This allows the wind noise to be reduced independent, of the other sub-bands. The sub-bands may then be recombined after the wind noise is filtered out.

Figure 1:
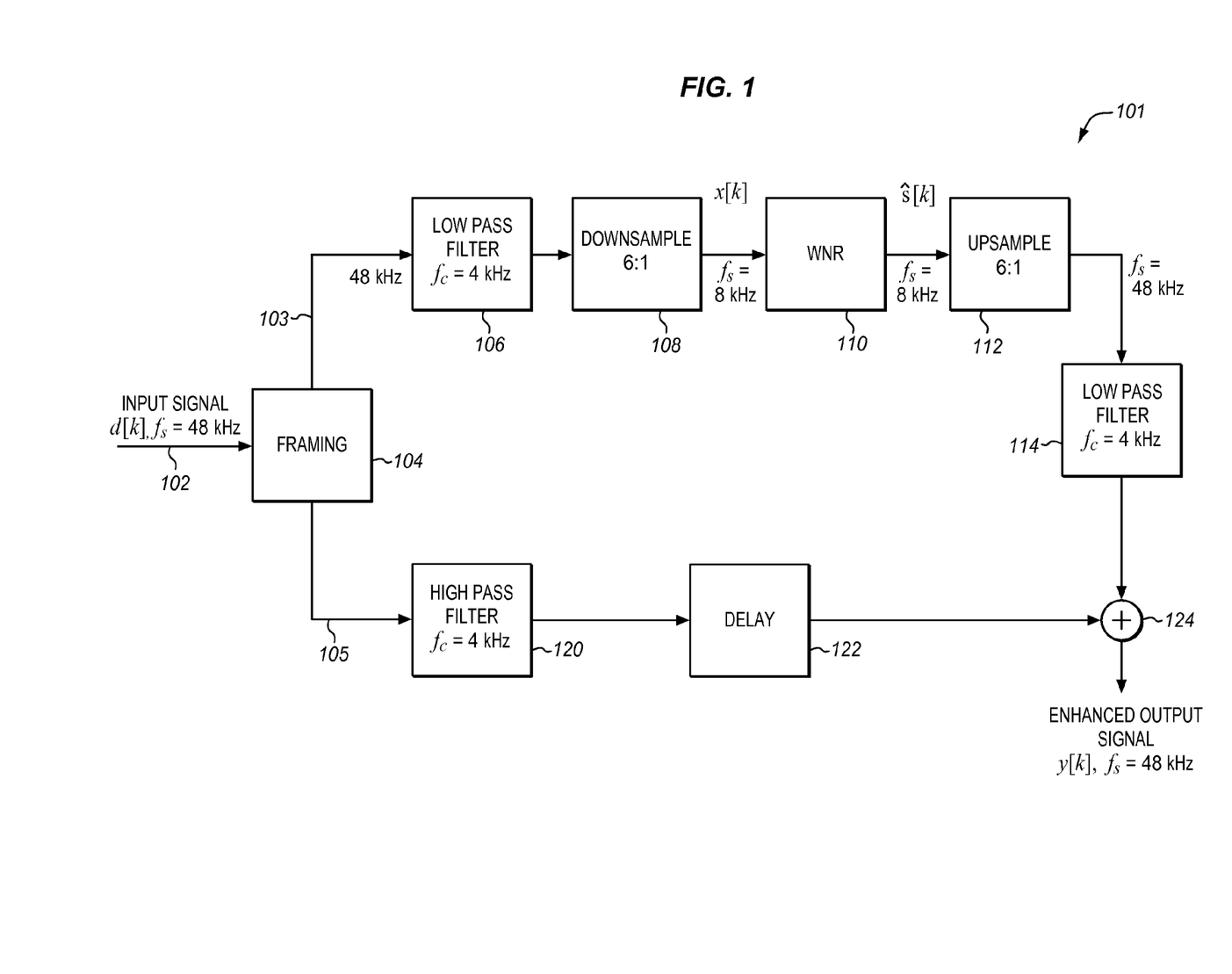
FIG. 1 is a block diagram of a system for receiving an audio system and applying wind noise reduction tot the signal according to an embodiment.

FIG. 1 shows a system 101 for applying wind noise reduction to an input audio signal 102. The audio signal in this example is in the form of a sequence of digital samples that have been taken from an analog to digital converter that is coupled to an analog microphone. In some cases the converter and microphone are combined and referred to as a digital microphone. The input signal is identified as d(k), $f_s$=48 kHz. This is to indicate that in this example the signal is a stream of k digital samples at a sampling rate of 48 kHz. 48 and the other numbers are used as examples, different filters and different sampling rates may be used depending on the particular implementation. The input audio samples are collected into frames at a framing block 104. The frame represents a short audio sequence, such as 10 or 20 milliseconds. However, a much longer or shorter audio sequence may be used depending on the particular implementation. If the audio system is part of a transmission system that has a framing protocol, the framing protocol for the transmission system may be used.

The input signal frames are sent on an upper path 103 and a lower path 105. These two copies of the signal are used to generate two sub-bands with a crossover frequency of 4 kHz. In the upper path the signal is low pass filtered 106 and then resampled to 8 kHz in a down sampler 108. The output down sampled signal x(k), $f_s$=8 kHz is then processed for wind noise reduction. After the processing, the noise reduced signal $\hat{S}(k) f_s$=8 kHz is up sampled back to 48 kHz in an up sampling block 112. The up sampled signal $\hat{S}(k)$ $f_s$=48 kHz is then applied to a low pass filter 114 to remove any higher frequency artifacts introduced during the sampling and noise reduction.

The lower path signals are high pass filtered at 4 kHz in a filter 120 and then delayed in a delay buffer 122. The delay buffer accommodates the delay caused by the group delay in the low pass filter. The delay buffer may also be adapted to account for any other delays in the other path, depending on the implementation of the filters, up and down samplers and noise reduction circuits of the upper path. The upper path output is then time aligned with the lower path output and the two signals are combined again in a combiner 124 to produce an output signal y(k), $f_s$=48 kHz with reduced wind noise and a 48 kHz sample rate.

This approach allows the preservation of the time and frequency resolution which is needed to perform wind noise reduction in audio signals. In the above description, a crossover frequency of 4 kHz was selected. In practice, this crossover frequency can vary. It may be lower or higher depending on the nature of the wind noise and the desired quality of the output signal. In another example 8 kHz may be used as the low pass filter cutoff frequency.

In the example of FIG. 1, a typical input sampling frequency of 48 kHz is considered. The spectrum of wind noise typically does not exceed 4 kHz. Therefore, the wind noise reduction system first decomposes 106, 120 a single channel d(k) of the input signal into two sub-bands 103, 105 with a crossover frequency of 4 kHz. 4 kHz refers to the frequency of the analog sounds in the original audio signal, not to the sampling rate. The low-pass filter 106 removes spectral images, and the signal can then be down sampled 108 by a factor of 6 to obtain a lower sub-band signal x(k) resampled to 8 kHz. 8 kHz is a minimum sampling rate for an audio signal with a maximum frequency of 4 kHz without aliasing.

The lower sub-band signal x(k) is then processed 110 using any of a variety of wind noise reduction techniques. The lower sampling rate and the lower maximum frequency greatly reduce the computation and memory resources required to perform the wind noise reduction on the signal. The enhanced signal is then up sampled 112 by the same factor in this case 6 and low-pass filtered 114 to remove spectral images which are introduced by up sampling and by any other processes. This signal is then added 124 to the delayed high-pass filtered signal. This delay is necessary to compensate for the additional low-pass filter in the upper branch of the signal processing chain shown in FIG. 1.

The same principle may be applied to signals with other sampling rates. Any sampling rate of 8 kHz or above may be used as an input audio signal If the input signal is sampled at 8 kHz, then the down sampling and up sampling of the upper path may be avoided. A higher or lower rate than 8 kHz may be used for the down sampling. With more resources, the system may instead down sample the audio to 16 kHz. This may provide for higher quality audio when the signals are recombined at 124. The down sampling rate may be selected based on the low pass filter cutoff frequency. As shown the down sampled audio rate of 8 kHz is selected to be double the highest audio frequency, e.g. 4 kHz, allowed by the filter. The low pass filter cutoff frequency is selected based on the characteristics of typical wind noise. For higher speed wind, a higher cutoff frequency may be selected while for gentler winds a lower cutoff frequency may be selected. For a lower or higher cutoff frequency a lower or higher down sampled rate may be selected.

The input audio d(k) may have any sampling rate depending on the application. 8 kHz and 16 kHz are common but some audio applications sample the input signal at higher rates to improve the output signal quality. Audio recordings are often sampled at 32 kHz, 48 kHz, or higher rates for higher signal fidelity.

When multiple microphones are used for a single recording, multiple wind noise reduction processes may be used. Wind noise often has low coherence between individual microphone signals. The approach of FIG. 1 can be applied independently to each of the microphone channels. This allows spatial cues from each of the individual microphones to be preserved.

The two filters, the low pass filter 106 and the high pass filter 120, constitute an audio crossover filter. This crossover filter may be designed to serve a dual role of both decomposing the input signal and acting as an anti-aliasing filter for the subsequent down sampling operation 108. While a regular filter bank may be used, by using a crossover instead of a regular filter-bank, the input signal is decomposed so that the frequency responses of the low-pass filter and of the high-pass filter are complementary and add to unity. This creates a structure where any numerical errors due to a fixed point implementation in the crossover filter are reflected in both the high-pass and low-pass branches. Accordingly, the numerical errors cancel each other out when the two upper and lower path branches are combined. The crossover-filter bank system provides an efficient low-distortion method of decomposing the input signal.

Figure 2:
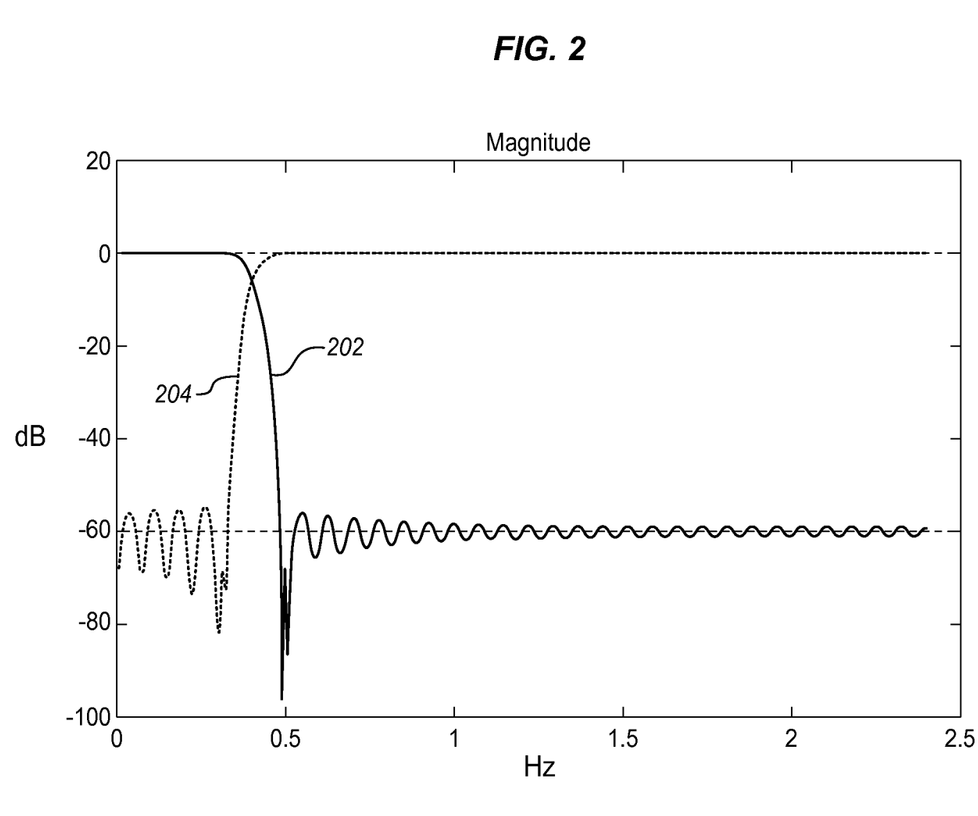
FIG. 2 is a graph of an output of a crossover filter such as that of FIG. 1 according to an embodiment.

The crossover filter may be designed by balancing the filter length, the transition bandwidth and the stop-band attenuation. Longer filter lengths provide more desirable filter design characteristics, such as sharper transition bandwidths and more stop-band attenuation. However, longer filter lengths introduce additional group delay. An example of a crossover filter output is shown in FIG. 2 which is a graph of amplitude on the vertical axis versus frequency on the horizontal axis. The two different signals are shown in which an upper path signal 202 has a high end cut-off frequency $f_c$ at 4 kHz. The lower path signal 204 has a low end cut off frequency at 4 kHz. Such a response may be produced with 129 filter coefficients (sampling frequency, $f_s$=48 kHz). The transition bandwidth has been set to 500 Hz with stop-band attenuation of −60 dB.

Figure 3:
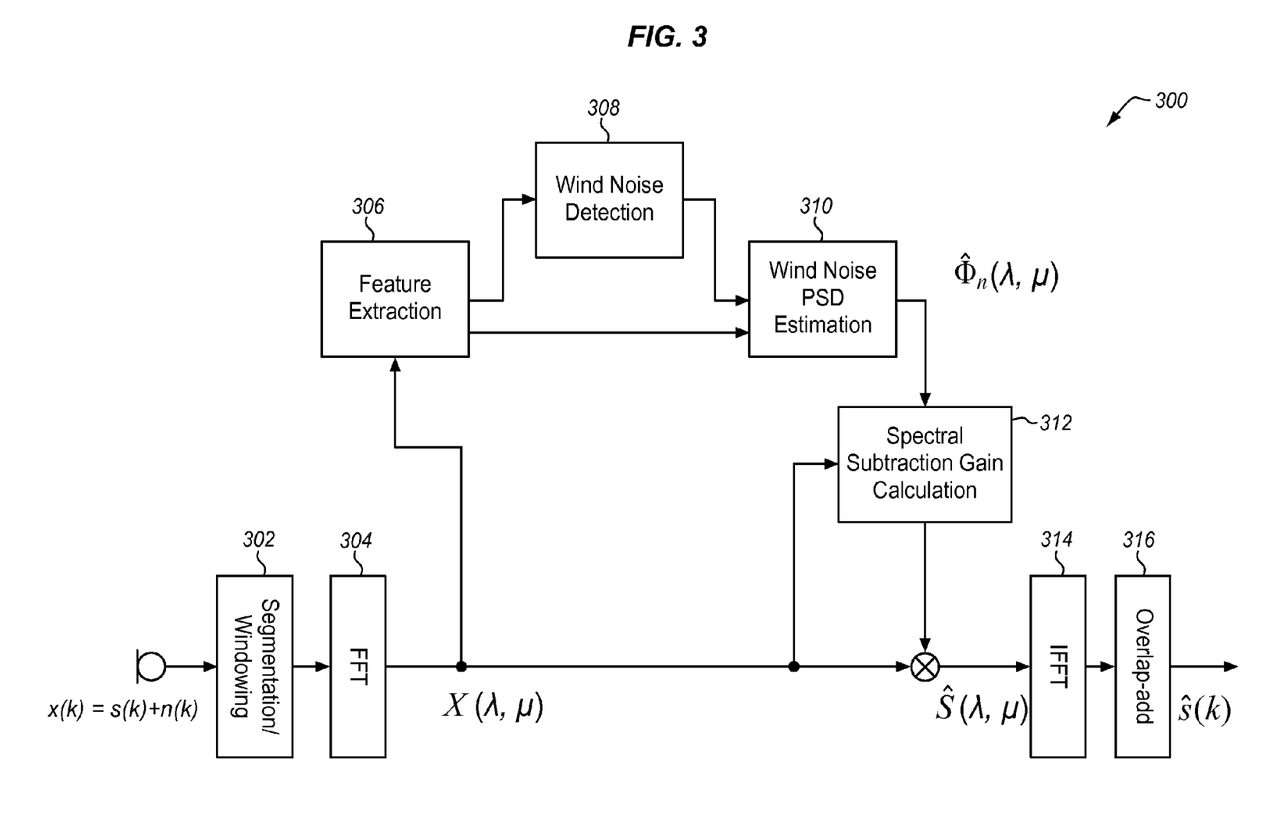
FIG. 3 is a block diagram of a wind noise reduction system suitable for use in embodiments.

FIG. 3 is a block diagram of an example of a wind noise reduction (WNR) system 300 that may be used as the wind noise reduction system 110 of FIG. 1. This system is shown as an example and a variety of other systems may be used, depending on the implementation. A segmentation (and/or windowing) circuit 302 is coupled to a FFT (fast Fourier transform) circuit 304 which supplies a result to a feature extraction circuit 306. The feature extraction supplies a result to a wind noise detection circuit 308 and to a wind noise PSD (power spectral density) estimation circuit 310 which is also coupled to the WND detection circuit 308. The estimation circuit is coupled to a spectral subtraction gain calculation circuit 312, the output of which is combined with the FFT output and supplied to an IFFT (inverse FFT) circuit 314 which is coupled to an overlap-add circuit 316.

The noisy speech signal x(k) is modeled by a superposition of the clean speech signal s(k) and the noise signal n(k), where k is the discrete time index of a digital signal. The estimation of the wind noise PSD $\hat{\phi}(\lambda, \mu)$ can be divided into two separate steps which may be carried out on a frame basis. The first step is wind noise detection (WND), including feature extraction (for example computation of the sub-band signal centroid (SSC) in each frame) and classification of signal frames as clean voiced speech, noisy voiced speech (speech+wind) or pure wind noise based on the extracted feature (for example the SCC value).

The second step is wind noise estimation (WNEST), which may include wind noise periodogram estimation based on the signal frame classification. Clean voiced speech results in no wind noise estimation. Noisy speech results in a minimum search in the spectrum and a polynomial fit. Pure wind noise results in using the input signal as a wind noise periodogram estimate. The WNEST may further include calculation of an adaptive smoothing factor for the final noise PSD estimate. The configuration of FIG. 3 may be repeated for each microphone.

In the example of FIG. 3, an overlap-add framework is provided. In one example, the noisy input signal x(k) is first segmented into frames of 20 ms with an overlap of 50% i.e. 10 ms. Afterwards each frame is windowed (e.g. with a Hann window) and transformed in the discrete frequency domain using the Fast Fourier Transform (FFT) yielding $X(\lambda, \mu)$ where $\lambda$ is the frame index and $\mu$ is the discrete frequency bin. The wind noise reduction is achieved in the frequency domain by multiplying the noisy spectrum $X(\lambda, \mu)$ with spectral gains $G(\lambda, \mu)$. The enhanced signal $\hat{S}(\lambda, \mu)$ is transformed in the time domain using the Inverse Fast Fourier Transform (IFFT). Finally the overlapping enhanced signal frames are summed up resulting in the output signal $\hat{s}(k)$.

Figure 4:
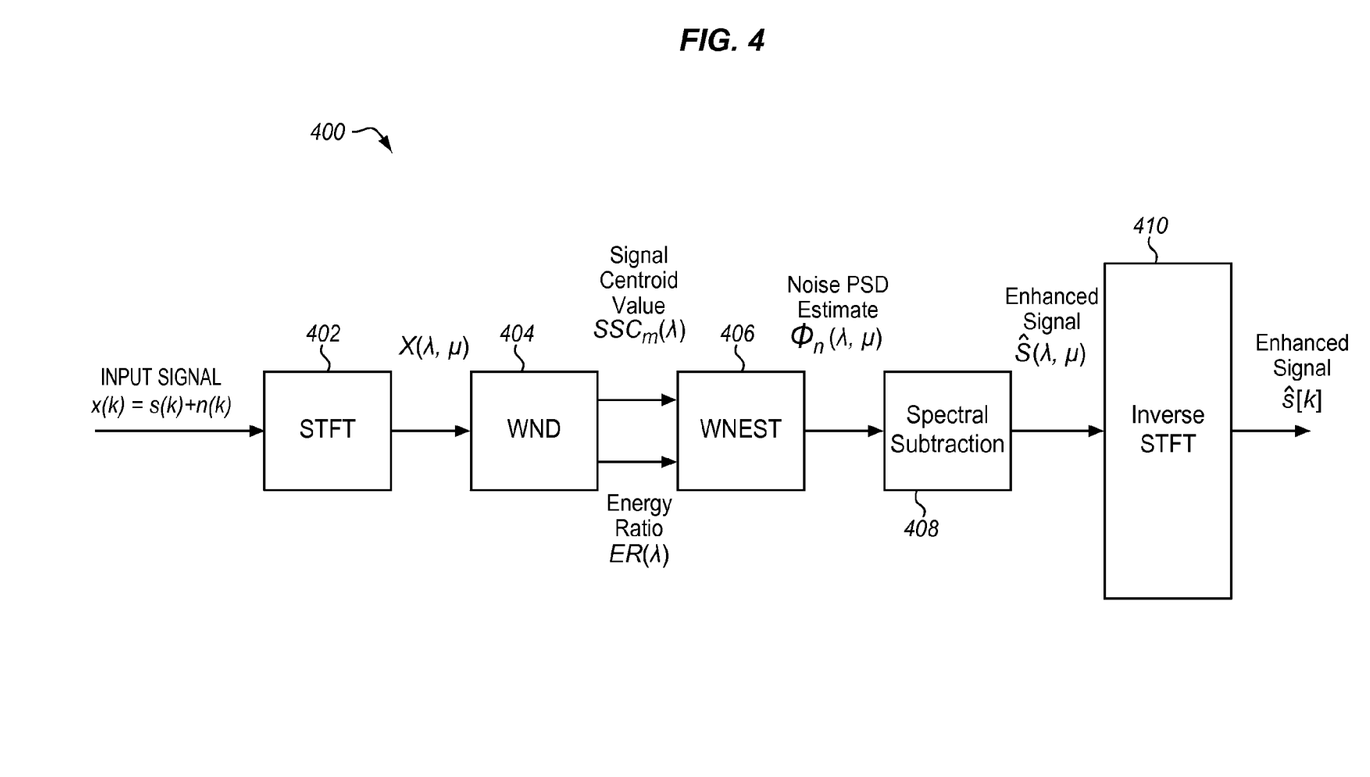
FIG. 4 is a block diagram of an alternative wind noise reduction system suitable for use in embodiments.

FIG. 4 is a block diagram of an alternative WNR system 400 that may be used as the WNR 110 of FIG. 1. In this alternative example, a STFT (short time Fourier transform) circuit 402 is coupled to a WND (wind noise detection) circuit 404 which is coupled to a WNEST (wind noise estimation) circuit 406 which is coupled to a spectral subtraction circuit 408 which is coupled to an inverse STFT circuit 410 which provides a wind noise reduced output.

Wind noise detection (WND) is first performed in the frequency domain to extract underlying signal characteristics and features which are used to detect the presence of wind noise. The Signal Sub-band Centroid value $SSC_m(\lambda)$ and the Energy Ratio $ER(\lambda)$ is determined in the WND and used in the Wind Noise Estimation (WNEST) technique to estimate the wind noise power when wind noise is detected. These wind noise components may then be attenuated by performing spectral subtraction. The output enhanced signal $\hat{S}[\lambda,\mu]$ may then be used to reconstruct the output signal using inverse STFT.

Figure 5:
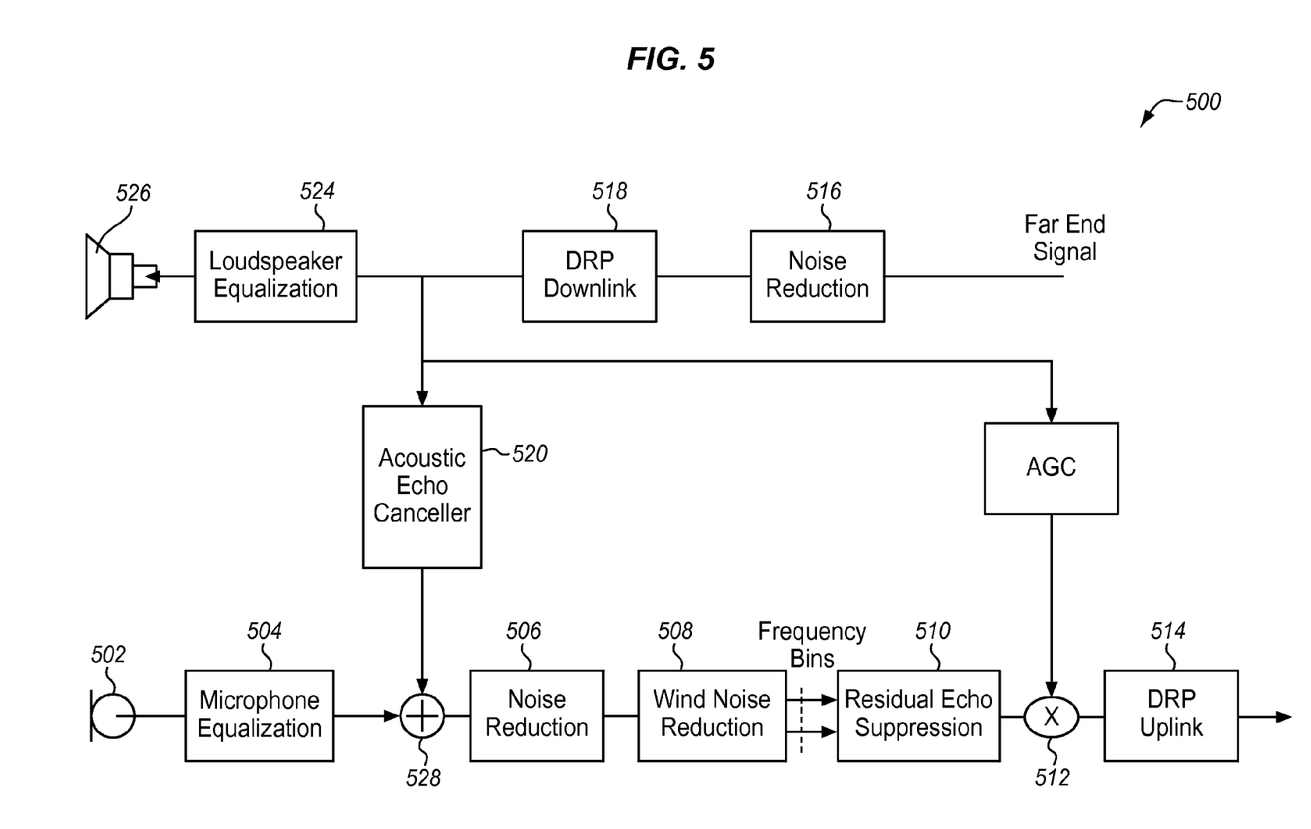
FIG. 5 is a block diagram of a communication link having an input and output audio link according to an embodiment.

FIG. 5 is a block diagram of a communication link having an audio output pipeline and an audio input pipeline to show how the system of FIG. 1, represented as Wind Noise Reduction 508 may be integrated into a voice communication or audio recording pipeline 500. The pipelines of FIG. 5 may be integrated into the system of FIG. 7 or another system using a variety of hardware and software resources. The uplink signal or near end signal from a microphone 502 is processed first by a microphone equalization circuit 504 and a noise reduction circuit (or module) 506. The output is input into the wind noise reduction circuit 508. The wind noise reduction circuit 508 may output frequency bins to a residual echo suppression circuit 510, depending on the implementation.

A multiplier 512 receives input data from an AGC (automatic gain control) circuit 522 and the residual echo suppression circuit 510, and provides output data to a DRP (Dynamic Range Processor) uplink circuit 514. This represents the filtered enhanced audio output to memory or to a transmission link. Any one or more of the filtering, equalization, cancelling, reducing, suppressing, and other sound enhancement components may be removed or replaced and other components may be added to suit particular implementations.

In the output pipeline shown at the top of the diagram, a far end signal, received from memory or from a remote device is input to a further noise reduction circuit 516, the output of which is input into a DRP downlink circuit 518. The output of the DRP downlink circuit 518 is input into an acoustic echo canceller 520 (which may provide its output to a summation circuit 528, which outputs its sum (further taking into account the output of the microphone equalization circuit 504) to the noise reduction circuit 506), the AGC circuit 522 and a loudspeaker equalization circuit 524. The loudspeaker equalization circuit 524 may provide its output to a loudspeaker 526.

Wind noise has unique, transient features that make it difficult to reduce. Embodiments may use any of a variety of different techniques and systems to reduce wind noise, depending on the particular implementation. A few implementations are shown in FIGS. 3 and 4. The operative details and some of the functions of the wind noise reduction in FIGS. 3 and 4 are described in the following. However, embodiments do not require this wind noise reduction.

Wind noise is mainly located at low frequencies (f<500 Hz) and shows approximately a 1/f-decay towards higher frequencies. Voiced speech segments show a harmonic structure and the main part of the signal energy is located at frequencies between 0 and 0.3000 Hz. Unvoiced segments of the near end signal are noise-like and show a high-pass characteristic of the signal energy (f>3000 Hz). Voiced speech is greatly affected by wind noise and not greatly affected by high pass noise.

For WND, a robust feature can be provided with which a classification of a current frame can be achieved. This feature is then mapped to perform the detection of the clean speech wind noise, or a soft decision on a mixture of the two previous cases.

SSCs (sub-band signal centroids) may be used to represent the spectral energy distribution of a signal frame $X(\lambda,\mu)$. The SSC of the m-th subband is defined as:

$$SSC_m(\lambda) = \frac{\sum_{\mu=\mu_{m-1}+1}^{\mu_m} \mu \cdot |X(\lambda, \mu)|^2}{\sum_{\mu=\mu_{m-1}+1}^{\mu_m} |X(\lambda, \mu)|^2} \quad \text{(Eq. 1)}$$

The frequency bins $\mu_m$ may define the limits between the subbands. For the system according to various aspects of this disclosure, only the centroid of the first subband $SSC_1$ covering the low frequency range (0-3000 Hz) is considered, in that case:

$$\mu_0 = 0 \text{ and } \mu_1 = \left\langle \frac{3000 \text{ Hz}}{f_s} \cdot N \right\rangle,$$

where $f_s$ is the sampling frequency, N is the size of the FFT and $\langle \ \rangle$ may stand for rounding to the next integer. The $SSC_1$ is seen as the "center-of-gravity" in the spectrum for a given signal.

Accordingly, $SSC_1$ is only affected by voiced speech segments and wind noise segments, whereas unvoiced speech segments have only marginal influence on the first centroid. For an ideal 1/f-decay of a wind noise signal, the $SSC_1$ value is constant and independent of the absolute signal energy, $SSC_1$ values for wind noise signals are typically concentrated below 100 Hz while voiced speech segments are distributed between 250 and 700 Hz. Using these $SSC_1$ values, a threshold can be used to detect pure wind noise or clean voiced speech segments.

There may also be a transient region with a superposition of speech and wind. Therefore in addition to the hard decision between the presence of voiced speech and wind noise, a soft value may be used to give information about the degree of the signal distortions.

In addition to the $SSC_1$, the energy ratio $ER(\lambda)$ between two frequency bands can be used as a safety-net for the detection of clean voiced speech and pure wind noise.

The energy ratio $ER(\lambda)$ is defined as follows:

$$ER(\lambda) = \frac{\sum_{\mu_2}^{\mu_3} |X(\lambda,\mu)|^2}{\sum_{\mu_0}^{\mu_1} |X(\lambda,\mu)|^2} \qquad (Eq.\ 2)$$

The frequency bins $\mu_0$, $\mu_1$, $\mu_2$ and $\mu_3$ define the frequency bins which limit the two frequency bands. If the limits $\mu_0$ and $\mu_1$, cover a lower frequency range (e.g. 0-200 Hz) than $\mu_2$ and $\mu_3$ (e.g. 00-400 Hz), a high value of the energy ratio $(ER(\lambda) \gg 1)$ indicates clean speech and a low value $(0 < ER(\lambda) < 1)$ indicates wind noise. Typical values for these thresholds are $ER(\lambda) < 0.2$ for the detection of pure wind noise and $ER(\lambda) > 10$ for the detection of clean voiced speech.

The wind noise estimation (WNEST) has been characterized as a power spectral density, PSD $\hat{\Phi}_n(\lambda,\mu)$. A PSD estimate $\hat{\Phi}_X(\lambda,\mu)$ of a given signal is derived via recursive smoothing of consecutive signal frames $X(\lambda,\mu)$:

$$\hat{\Phi}_X(\lambda,\mu) = \alpha(\lambda) \cdot \hat{\Phi}_X(\lambda-1,\mu) + (1-\alpha(\lambda)) \cdot |X(\lambda,\mu)|^2, \qquad (Eq.\ 3)$$

where the smoothing factor $\alpha(\lambda)$ may take values between 0 and 1 and can be chosen fixed or adaptive. The magnitude squared Fourier transform $|X(\lambda,\mu)|^2$ is called a periodogram. For the required wind noise PSD $\hat{\Phi}_n(\lambda,\mu)$ the periodograms of the noise $|N(\lambda,\mu)|^2$ signal are not directly accessible since the input signal contains both speech and wind noise. Hence for the system according to various aspects of this disclosure, the noise periodograms is estimated based on the classification defined in the previous section. For the range where wind noise is predominant, the input signal can directly be used as noise periodogram. In a range with clean speech, the noise periodogram is set to zero. For the estimation for a range in which both voiced speech and wind noise are active, a more sophisticated approach is used which exploits the spectral characteristics of wind noise and voiced speech.

As described above, the spectrum of wind noise may have a 1/f-decay. Thus, the wind noise periodograms is approximated with a simple polynomial as:

$$|\hat{N}_{pol}(\lambda,\mu)|^2 = \beta \cdot \mu^\gamma. \qquad (Eq.\ 4)$$

The parameters $\beta$ and $\gamma$ are introduced to adjust the power and the decay of $|N_{pol}(\lambda,\mu)|^2$. Typical values for the decay parameter $\gamma$ lie between $-2$ and $-0.5$. For the computation of $\beta$ and $\gamma$, two supporting points in the spectrum are required, and these are assigned to the wind noise periodogram. Voiced speech has a harmonic structure due to resonances of the speaker. The harmonics are manifested as local maxima at the frequency of the spoken note and at multiples of this frequency. Wind noise does not show a harmonic structure.

For the estimation of the wind noise periodogram during voiced speech activity, the first two minima of the voiced speech may be used as supporting points for the polynomial approximation in Eq. (4).

Given two minima at the frequency bins $\mu_{min1}$ and $\mu_{min2}$, the parameter $\beta$ and $\gamma$ is estimated as follows:

$$\gamma = \frac{\log\left(\frac{|X(\lambda,\mu_{min1})|^2}{|X(\lambda,\mu_{min2})|^2}\right)}{\log\left(\frac{\mu_{min1}}{\mu_{min2}}\right)} \qquad (Eq.\ 5)$$

and $$\beta = \frac{|X(\lambda,\mu_{min2})|^2}{\mu_{min2}^\gamma} \qquad (6)$$

In order to prevent an overestimation of the wind noise periodogram especially fair low frequencies ($<100$ Hz), the calculated periodogram is limited by the current periodogram as $$|\hat{N}'_{pol}(\lambda,\mu)|^2 = \min(|\hat{N}_{pol}(\lambda,\mu)|^2, |\hat{X}(\lambda,\mu)|^2). \qquad (7)$$

The calculation of the wind noise periodogram based on the current $SSC_1$ value is summarized as:

$$|\hat{N}(\lambda,\mu)|^2 = \begin{cases} |X(\lambda,\mu)|^2, & \text{if } SCC_1(\lambda) < \theta_1 \\ |\hat{N}'_{pol}(\lambda,\mu)|^2, & \text{if } \theta_1 < SCC_1(\lambda) < \theta_2 \\ 0, & \text{if } SCC_1(\lambda) > \theta_2 \end{cases} \qquad (8)$$

Figure 7:
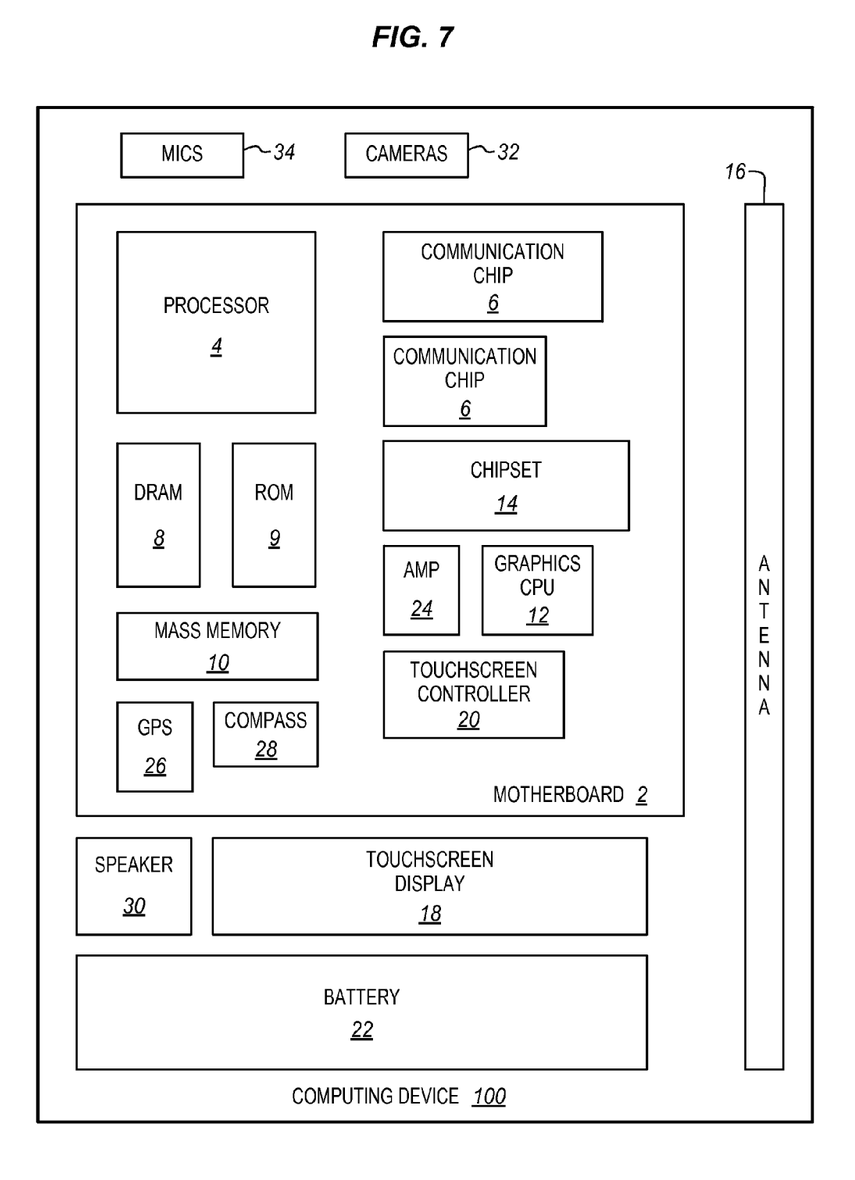
FIG. 7 is a block diagram of a computing device incorporating wind noise reduction according to an embodiment.

$\theta_1$ and $\theta_2$ represent the thresholds of the $SSC_1$ values between the three ranges defined in FIG. 7. The thresholds can be set to 200 and 600 Hz as the corresponding frequencies for $\theta_1$ and $\theta_2$.

For the determination of the required wind noise PSD, the recursive smoothing given in Eq. (3) is applied to the periodograms of Eq. (8). Here the choice of the smoothing factor $\alpha(\lambda)$ plays an important role. On one hand, a small smoothing factor allows a fast tracking of the wind noise but has the drawback that speech segments which are wrongly detected as wind noise have a great influence on the noise PSD. On the other hand, a large smoothing factor close to 1 reduces the effect of wrong detection during speech activity but leads to slow adaptation speed of the noise estimate. Thus, an adaptive computation of $\alpha(\lambda)$ is favorable where low values are chosen during wind in speech pauses and high values during speech activity. Since the $SSC_1$ value is an indicator for the current SNR condition, the following linear mapping for the smoothing factor is used:

$$\alpha(\lambda) = \begin{cases} \alpha_{min}, & SSC_1(\lambda) < \theta_1 \\ \frac{\alpha_{max} - \alpha_{min}}{\theta_2 - \theta_1} \cdot SSC_1(\lambda) + \frac{\alpha_{min} \cdot \theta_2 - \alpha_{max} \cdot \theta_1}{\theta_2 - \theta_1}, & \theta_1 < SSC_1(\lambda) < \theta_2 \\ \alpha_{max}, & SSC_1(\lambda) > \theta_2 \end{cases} \qquad (Eq.\ 9)$$

This relation between the smoothing factor $\alpha(\lambda)$ and the $SSC_1(\lambda)$ value leads to a fast tracking and consequently accurate noise estimate in speech pauses and reduces the risk of wrongly detecting speech as wind noise during speech activity. Furthermore a nonlinear mapping such as a sigmoid function can be applied for the relation between $SSC_1(\lambda)$ and $\alpha(\lambda)$.

The wind noise is reduced by multiplying the noisy spectrum $X(\lambda,\mu)$ with the spectral gains $G(\lambda,\mu)$ The spectral gains are determined from the estimated noise PSD $\hat{\Phi}_n(\lambda,\mu)$ and the noisy input spectrum $X(\lambda,\mu)$ using a spectral subtraction approach:

$$G(\lambda, \mu) = \sqrt{1 - \frac{\hat{\Phi}_n(\lambda, \mu)}{|X(\lambda, \mu)|^2}} \quad \text{(Eq. 10)}$$

For wind noise detection, the energy distribution and consequently the signal centroids are shifted toward higher frequencies. To adapt the wind noise reduction system, the thresholds $\theta_1$ and $\theta_2$ for the signal classification and the smoothing factor calculation is modified. This may result in the modification of the smoothing factor from Eq. 9, For wind noise estimation the high pass characteristic of the microphone may result in low signal power below the cut-off frequency of the microphone. This may reduce the accuracy of the approximation as described above. To overcome this problem, the minima search described above is performed above the microphone cut-off frequency.

Figure 6:
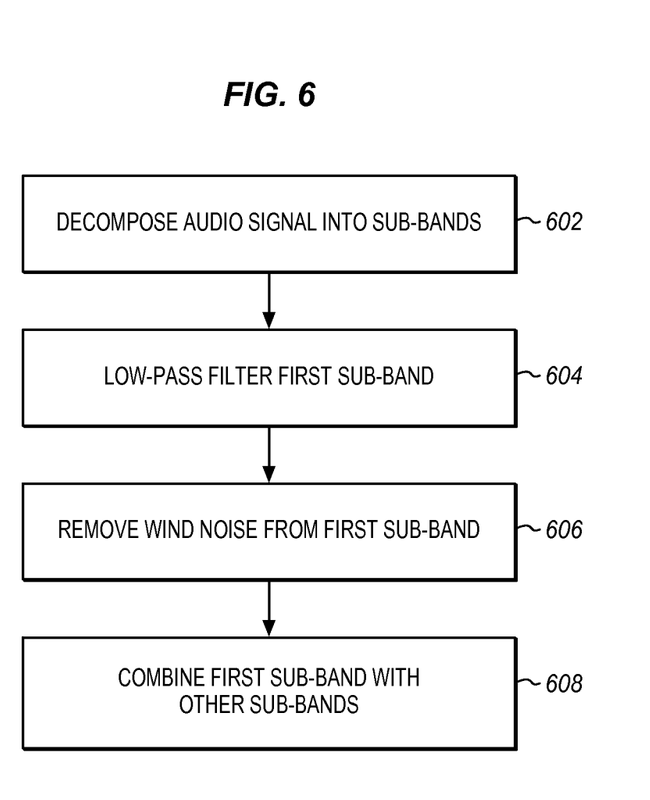
FIG. 6 is a process flow diagram of reducing wind noise in accordance with an embodiment.

FIG. 6 is a process low diagram for reducing wind noise using less computational resources as described herein. At 602 the audio signal is decomposed into sub-bands. In the example of FIG. 1, only two sub-bands are used but embodiments are not so limited. At 604, one of the sub-bands is low-pass filtered. The low pass filter may be at 4 kHz, however other lower frequencies may also be used, depending on the particular implementation. In many circumstances almost all of the wind noise is below 0.5 kHz so even a 1 kHz low pass filter may be used, At 606 the wind noise is removed from the first sub-band and at 608 the first sub-band is combined with the other sub-hands. Underlying this process is an idea that the wind noise will be exclusively or at least primarily in the first sub-band so that only the first sub-band need be processed for wind noise. The other sub-bands may be processed for other noises, depending on the implementation as shown for example in FIG. 5. The first sub-band may also be processed for other noises as shown in FIG. 5. For example in the two path example of FIG. 1, the second path has the higher frequencies above 4 kHz, this sub-band typically carries a variety of different hiss and squeak noises. These may be reduced in a separate process.

In the lower path, the computational resources required for wind noise reduction may be further reduced by down sampling the first sub-band before reducing the wind noise and then up sampling the reduced noise signal back to the original sample rate before combining it with the other sub-band. Since the first sub-band is low pass filtered. It can be down sampled without a significant loss of audio quality. Higher sampling rates are primarily helpful in reproducing higher frequency sounds which have been filtered out of the first sub band.

FIG. 7 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system hoard, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (MEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as OPS, EDGE, GPRS, CDMA, WiMAX, LTE, Ev-DO, and others.

The microphones 34 and the speaker 30 are coupled to an audio front end 36 to perform digital conversion, coding and decoding, and wind noise reduction as described herein. The processor 4 is coupled to the audio front end to drive the process with interrupts, set parameters, and control operations of the audio front end. Frame-based processing may be performed in the audio front end or in the communication package 6.

In various implementations, the computing device 100 may be a laptop, a netbook, a notebook, an ultrabook, a smartphone, a tablet, a personal digital assistant (FDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA), References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes decomposing an audio signal into a plurality of sub-bands, the audio signal including wind noise, low-pass filtering a first sub-band of the plurality of sub-bands, removing wind noise from the first sub-band after low-pass filtering, and combining the first sub-band with the other sub-bands of the plurality of sub-bands after removing wind noise, In some embodiment the audio signal is sampled at a first sampling rate, the method further including down sampling the first sub-band to a second sampling rate before removing wind noise, and up sampling the first sub-band to the first sampling rate after removing the wind noise.

Further embodiments include low-pass filtering the first sub-band after up sampling.

Some embodiments include low-pass filtering the first sub-band before removing wind noise and low-pass filtering after up sampling are both performed at the same to pass filter cutoff frequency.

In some embodiments the low-pass filtering cutoff frequency is selected to be above a wind noise frequency. Some embodiments include applying the audio signal to a crossover filter that produces the plurality of sub-bands.

In some embodiments, the audio signal comprises a stream of digital samples received from a microphone and a digital-to-analog converter. In some embodiments, the digital samples have a first sampling frequency, the method further comprising down sampling the first sub-band to a second sampling rate lower than the first sampling rate before removing wind noise.

In some embodiments, removing wind noise comprises estimating a power spectral density of the first sub-band to determine a presence of wind noise and then reducing the wind noise by applying a spectral subtraction to the sub-band, Some embodiments pertain to an apparatus that includes a frequency filter to decompose an audio signal into a plurality of sub-bands, the audio signal including wind noise, a low-pass filter to filter a first sub-band of the plurality of sub-bands, a noise removal circuit to remove wind noise from the first sub-band after low-pass filtering, and a combiner to combine the first sub-band with the other sub-bands of the plurality of sub-bands after removing wind noise, Some embodiments further include a first sampling rate converter to down sample the first sub-band to a second sampling rate before removing wind noise and a second sample rate converter to up sample the first sub-band to the first sampling rate after removing the wind noise.

Some embodiments further include a second low pass filter to filter the first sub-band after up sampling.

In some embodiments, the first and second low pass filters have the same low pass filter cutoff frequency. In some embodiments, the low-pass filter cutoff frequency is selected to be above a wind noise frequency. In some embodiments, the audio signal comprises a stream of digital samples received from a microphone and a digital-to-analog converter. In some embodiments, the digital samples have a first sampling frequency, the method further comprising down sampling the first sub-band to a second sampling rate lower than the first sampling rate before removing wind noise. In some embodiments, the noise removal circuit removes wind noise by estimating as power spectral density of the first sub-band to determine a presence of wind noise and then reducing the wind noise by applying a spectral subtraction to the sub-band.

Some embodiments pertain to an apparatus that includes a microphone, an analog to digital converter coupled to the microphone to produce an audio signal as a sequence of samples, a frequency filter to decompose the audio signal into a plurality of sub-bands, the audio signal including wind noise, a low-pass filter to filter a first sub-hand of the plurality of sub-bands, a noise removal circuit to remove wind noise from the first sub-band after low-pass filtering, a combiner to combine the first sub-band with the other sub-bands of the plurality of sub-bands after removing wind noise, and a transmitter to transmit the filtered audio to a remote device.

Some embodiments further include a framing circuit to combine samples of the audio signal into frames before decomposing the audio signal. In some embodiments, the first sub-hand has a low pass filter cutoff frequency of 4 kHz, the apparatus further comprising a sample rate conversion circuit to down sample the first sub-band to 8 kHz before removing wind noise.

What is claimed is:

1. A method comprising:
    sampling an audio signal at a first sampling rate;
    decomposing the sampled audio signal into a plurality of sub-bands in a fixed point audio crossover filter, the audio signal including wind noise;
    low-pass filtering a first sub-hand of the plurality of sub-hands;
    down sampling the sub-band to a second lower sampling rate;
    removing wind noise from the first sub-band after low-pass filtering and down sampling by first performing a short time Fourier transform to produce a plurality of frequency bins, second determining an energy ratio and centroid value for the transformed sub-bands to detect wind noise, and third estimating the wind noise to be removed using the determined centroid values for the transformed sub-bands;

up sampling the first sub-band to the first sampling rate after removing the wind noise;

delaying the other sub-bands to accommodate delay in removing wind noise; and combining the first sub-band with the other delayed sub-bands of the plurality of sub-bands after removing wind noise.

2. The method of claim 1, further comprising low-pass filtering the first sub-band after upsampling.

3. The method of claim 2, wherein low-pass filtering the first sub-band before removing wind noise and low-pass filtering after up sampling are both performed at the same low pass filter cutoff frequency.

4. The method of claim 3, wherein the low-pass filtering cutoff frequency is selected to be above a wind noise frequency.

5. The method of claim 1, wherein decomposing comprises applying the audio signal to a crossover filter that produces the plurality of sub-bands.

6. The method of claim 1, wherein the audio signal comprises a stream of digital samples received from a microphone and a digital-to-analog converter.

7. The method of claim 6, wherein the digital samples have a first sampling frequency, the method further comprising down sampling the first sub-band to a second sampling rate lower than the first sampling rate before removing wind noise.

8. The method of claim 1, wherein removing wind noise comprises estimating a power spectral density of the first sub-band to determine a presence of wind noise and then reducing the wind noise by applying a spectral subtraction to the sub-band.

9. An apparatus comprising:
an analog to digital converter to sample an audio signal at a first sampling rate;
a fixed point audio crossover frequency filter to decompose the sampled audio signal into plurality of sub-bands, the audio signal including wind noise;
a low-pass filter to filter a first sub-band of the plurality of sub-bands;
a noise removal circuit to remove wind noise from the first sub-band after low-pass filtering by first performing a short time Fourier transform to produce a plurality of frequency bins, second determining an energy ratio and centroid value for the transformed sub-bands to detect wind noise, and third estimating the wind noise to be removed using the determined centroid values for the transformed sub-bands;
a sampling rate converter to down sample the first sub-band to a second lower sampling rate before removing the wind noise and to up sample the first sub-band to the first sampling rate after removing the wind noise;
a delay buffer to delay the other sub-bands to accommodate the delay in removing wind noise; and
a combiner to combine first sub-band with the other sub-bands of the plurality of sub-bands after removing wind noise.

10. The apparatus of claim 9, wherein the sampling rate converter comprises:

a first sampling rate converter to down sample the first sub-band to a second sampling rate before removing wind noise; and a second sample rate converter to up sample the first sub-band to the first sampling rate after removing the wind noise.

11. The apparatus of claim 10, further comprising a second low pass filter to filter the first sub-band after up sampling.

12. The apparatus of claim 11, wherein the first and second low pass filters have the same low pass filter cutoff frequency.

13. The apparatus of claim 12, wherein the low-pass filter cutoff frequency is selected to be above a wind noise frequency.

14. The apparatus of claim 9, wherein the audio signal comprises a stream of digital samples received from a microphone and provided to the digital-to-analog converter.

15. The apparatus of claim 9, wherein the noise removal circuit removes wind noise by estimating a power spectral density of the first sub-band to determine, a presence of wind noise and then reducing the wind noise by applying a spectral subtraction to the sub-band.

16. An apparatus comprising:
a microphone;
an analog digital converter coupled to the microphone to produce audio signal as a sequence of samples at a first sampling rate;
a fixed point audio crossover frequency filter to decompose the audio signal into a plurality of sub-bands, the audio signal including wind noise;
a low-pass filter to filter a first sub-band of the plurality of sub-hands;
a noise removal circuit to remove wind noise from the first sub-band after low-pass filtering by first performing a short time Fourier transform to produce a plurality of frequency bins, second determining an energy ratio centroid value for the transformed sub-bands to detect wind noise, and third estimating the wind noise to be removed using the determined centroid values for the transformed sub-bands;
a sampling rate converter to down sample the first sub-band to a second lower sampling rate before removing the wind noise and to up sample the first sub-band to the first sampling rate after removing the wind noise;
a delay buffer to delay the other sub-bands to accommodate the delay in removing wind noise;
a combiner to combine the first sub-hand with the other sub-hands of the plurality of sub-bands after removing wind noise; and
a transmitter to transmit the filtered audio to a remote device.

17. The apparatus of claim 16, further comprising a framing circuit to combine samples of the audio signal into frames before decomposing the audio signal.

18. The apparatus of claim 16, wherein the first sub-band has a low pass filter cutoff frequency of 4 kHz, the apparatus further comprising a sample rate conversion circuit to down sample the first sub-band to 8 kHz before removing wind noise.

* * * * *